US010168864B2

(12) United States Patent
Holt et al.

(10) Patent No.: US 10,168,864 B2
(45) Date of Patent: Jan. 1, 2019

(54) GESTURE MENU

(71) Applicant: Citrix Systems, Inc., Fort Lauderdale, FL (US)

(72) Inventors: David Holt, Raleigh, NC (US); Justin Ware, Raleigh, NC (US); Ryan Morton, Raleigh, NC (US); Caroline Ford, Raleigh, NC (US); Nancy Jin, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 890 days.

(21) Appl. No.: 14/603,781

(22) Filed: Jan. 23, 2015

(65) Prior Publication Data

US 2015/0212667 A1 Jul. 30, 2015

Related U.S. Application Data

(60) Provisional application No. 61/931,210, filed on Jan. 24, 2014, provisional application No. 61/987,220, filed on May 1, 2014.

(51) Int. Cl.
G06F 3/041 (2006.01)
G06F 3/048 (2013.01)
G06F 3/0481 (2013.01)
G06F 3/0482 (2013.01)
G06F 3/0484 (2013.01)
G06F 3/0485 (2013.01)
G06F 3/0488 (2013.01)
H05B 37/02 (2006.01)

(52) U.S. Cl.
CPC ........ *G06F 3/0482* (2013.01); *G06F 3/04842* (2013.01); *G06F 3/04883* (2013.01)

(58) Field of Classification Search
CPC ... G06F 3/00; G06F 3/01; G06F 3/017; G06F 3/041; G06F 3/048; G06F 3/0481; G06F 3/0482; G06F 3/0485; G06F 3/0488; H05B 37/02
See application file for complete search history.

(56) References Cited

U.S. PATENT DOCUMENTS 5,305,435 A * 4/1994 Bronson ............... G06F 3/0481
715/775
5,874,958 A * 2/1999 Ludolph ................ G06F 9/451
715/781

(Continued)

Primary Examiner — Xiomara L Bautista
(74) Attorney, Agent, or Firm — BainwoodHuang

(57) ABSTRACT

A method performed by a computing device of presenting an application menu on a touchscreen includes (a) receiving a signal from the touchscreen indicating that a user has touched an MAE displayed on a screen of the application, (b) in response to receiving, displaying the menu on the touchscreen, (c) receiving a signal from the touchscreen indicating that the user is sliding a cursor across the touchscreen in a first direction and, in response, moving a display position of a slider element of the menu correspondingly on the touchscreen, (d) receiving a signal from the touchscreen indicating that the user has slid the cursor in a second direction substantially orthogonal to the first direction past a selection threshold and, in response, selecting a menu item corresponding to a current location of the cursor, and (e) in response to selecting the menu item, performing an action corresponding to the menu item.

25 Claims, 16 Drawing Sheets

(56) References Cited

U.S. PATENT DOCUMENTS

| | | | |
|---|---|---|---|
| 7,966,577 B2* | 6/2011 | Chaudhri | G06F 3/0482 |
| | | | 345/473 |
| 9,176,657 B2* | 11/2015 | Tumwattana | G06F 3/0485 |
| 9,377,925 B2 | 6/2016 | Anderson et al. | |
| 9,576,422 B2* | 2/2017 | Bowers | G07F 17/3213 |
| 2002/0030664 A1* | 3/2002 | Schena | G05G 9/047 |
| | | | 345/163 |
| 2008/0158189 A1* | 7/2008 | Kim | G06F 3/04886 |
| | | | 345/173 |
| 2008/0215978 A1* | 9/2008 | Bamba | G06F 3/0482 |
| | | | 715/713 |
| 2009/0282360 A1* | 11/2009 | Park | G06F 3/0482 |
| | | | 715/786 |
| 2010/0229125 A1* | 9/2010 | Cha | G06F 3/017 |
| | | | 715/828 |
| 2010/0306702 A1* | 12/2010 | Warner | G06F 3/04817 |
| | | | 715/811 |
| 2011/0047491 A1* | 2/2011 | Hwang | G06F 3/0488 |
| | | | 715/765 |
| 2012/0030583 A1* | 2/2012 | DiPietro | G06F 3/0416 |
| | | | 715/745 |
| 2012/0032877 A1* | 2/2012 | Watkins, Jr. | G06F 1/1624 |
| | | | 345/156 |
| 2012/0089927 A1* | 4/2012 | Salmen | G07G 1/0009 |
| | | | 715/753 |
| 2013/0042177 A1* | 2/2013 | Dunko | H04M 1/72522 |
| | | | 715/716 |
| 2013/0235271 A1* | 9/2013 | Kasuga | H04N 5/44543 |
| | | | 348/569 |
| 2015/0074603 A1* | 3/2015 | Abe | G06F 3/0482 |
| | | | 715/823 |

* cited by examiner

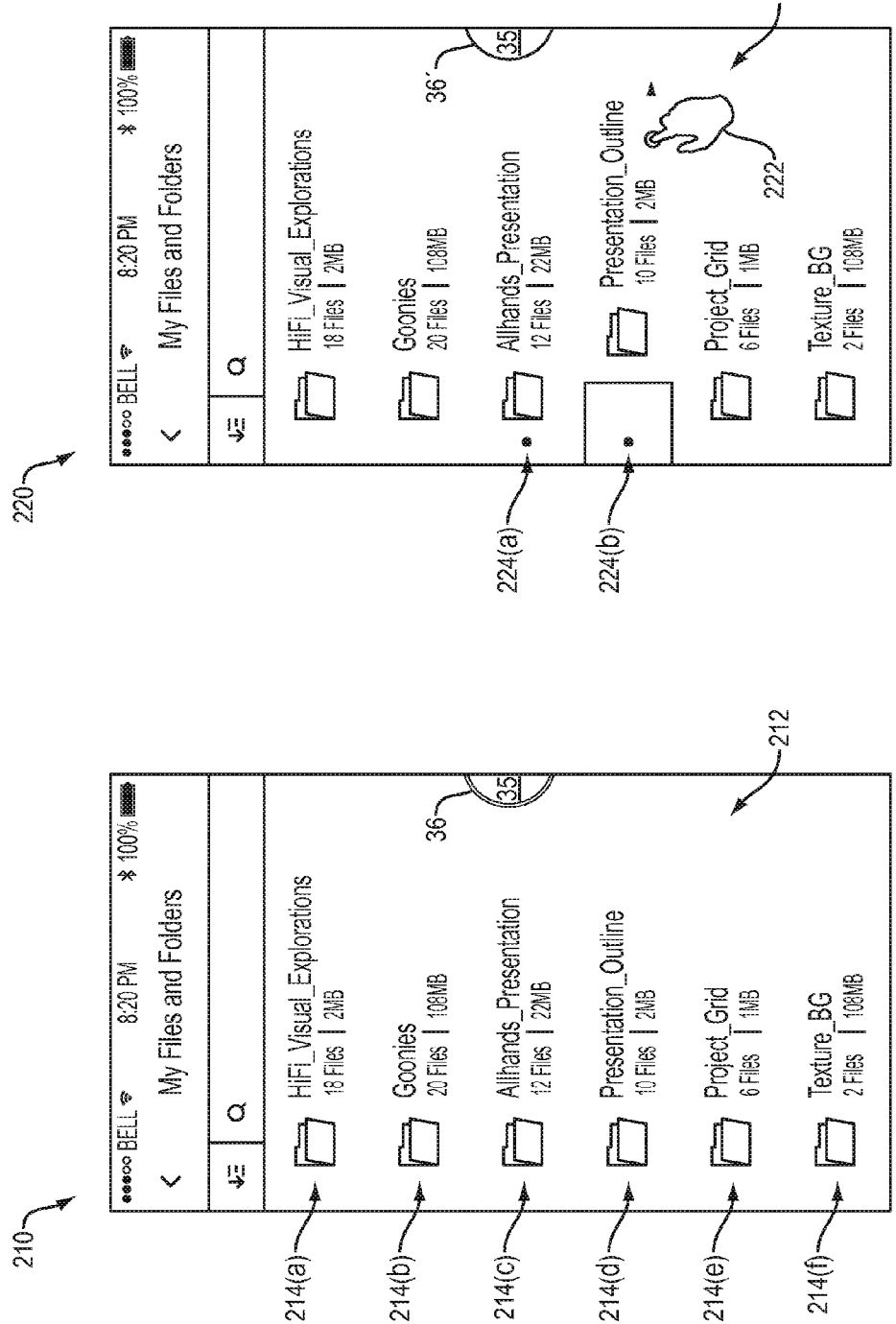

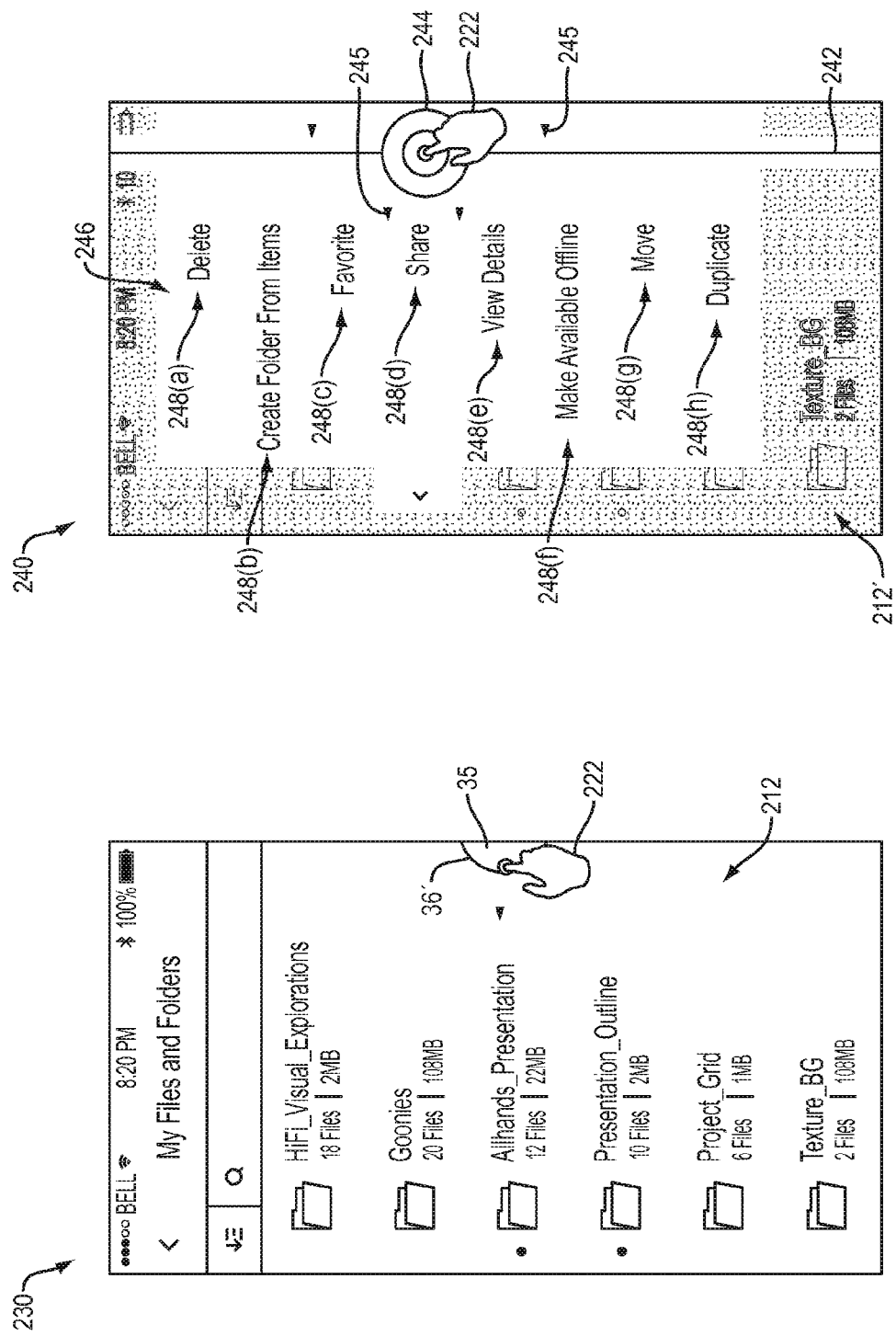

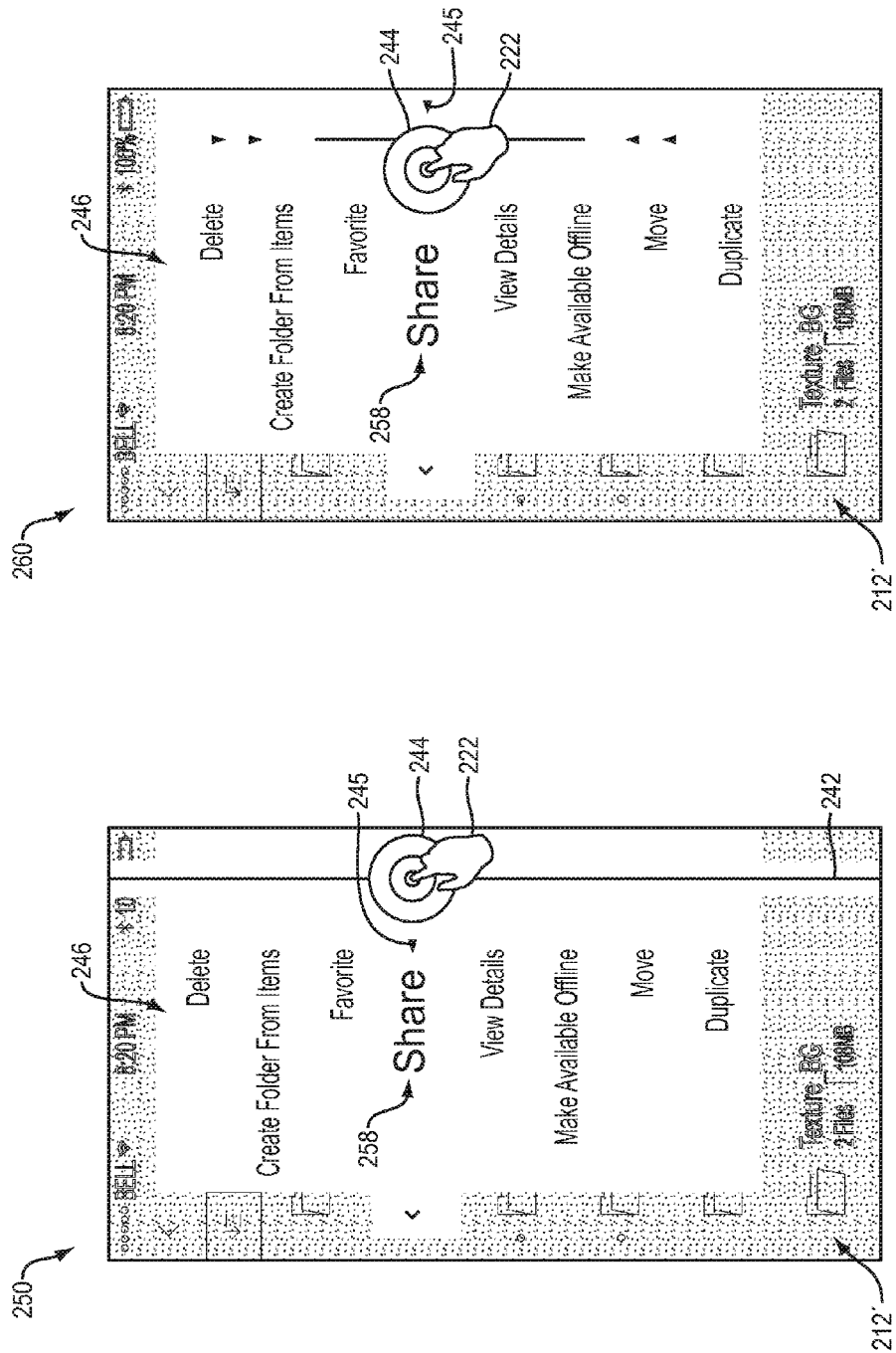

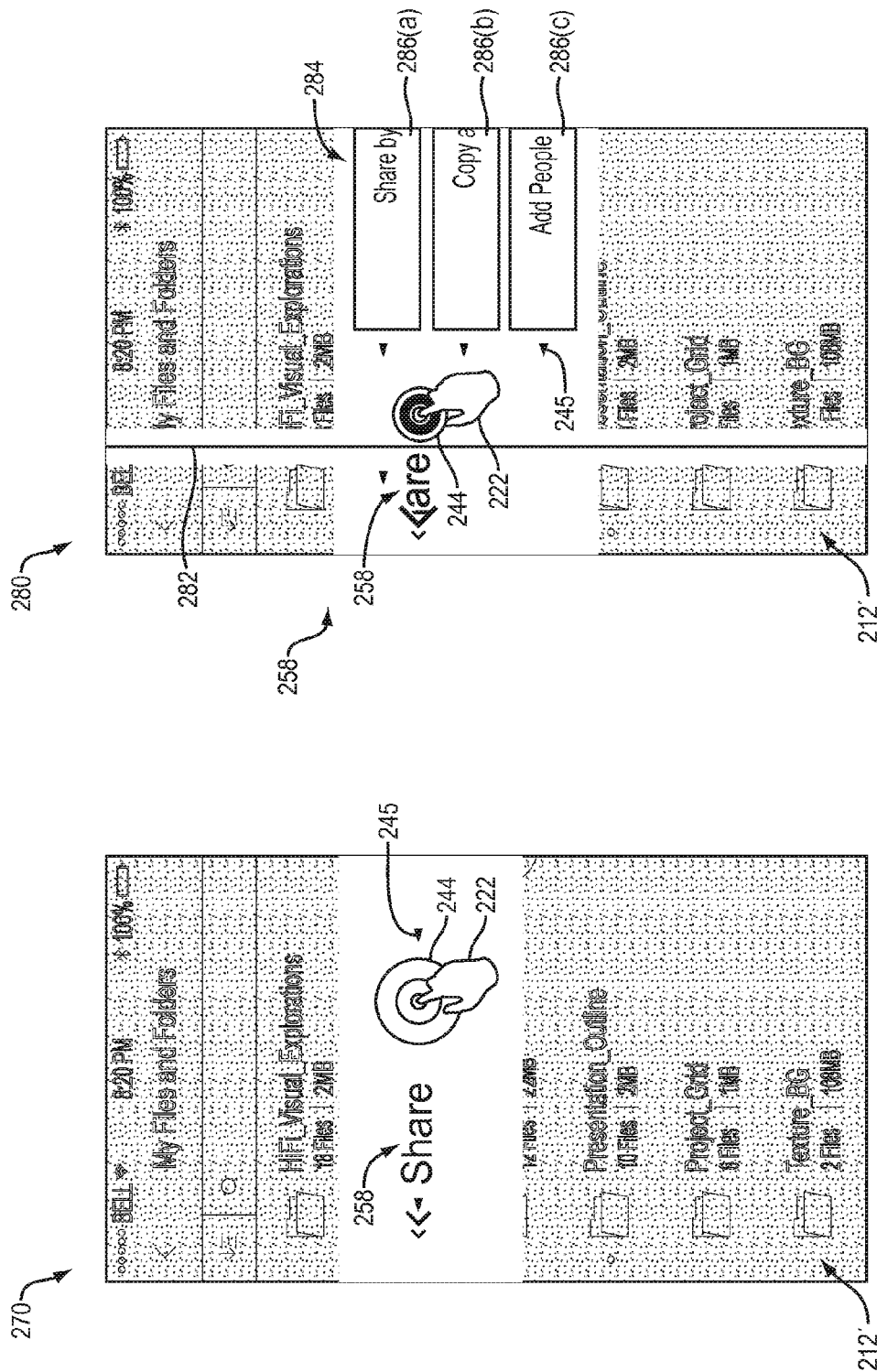

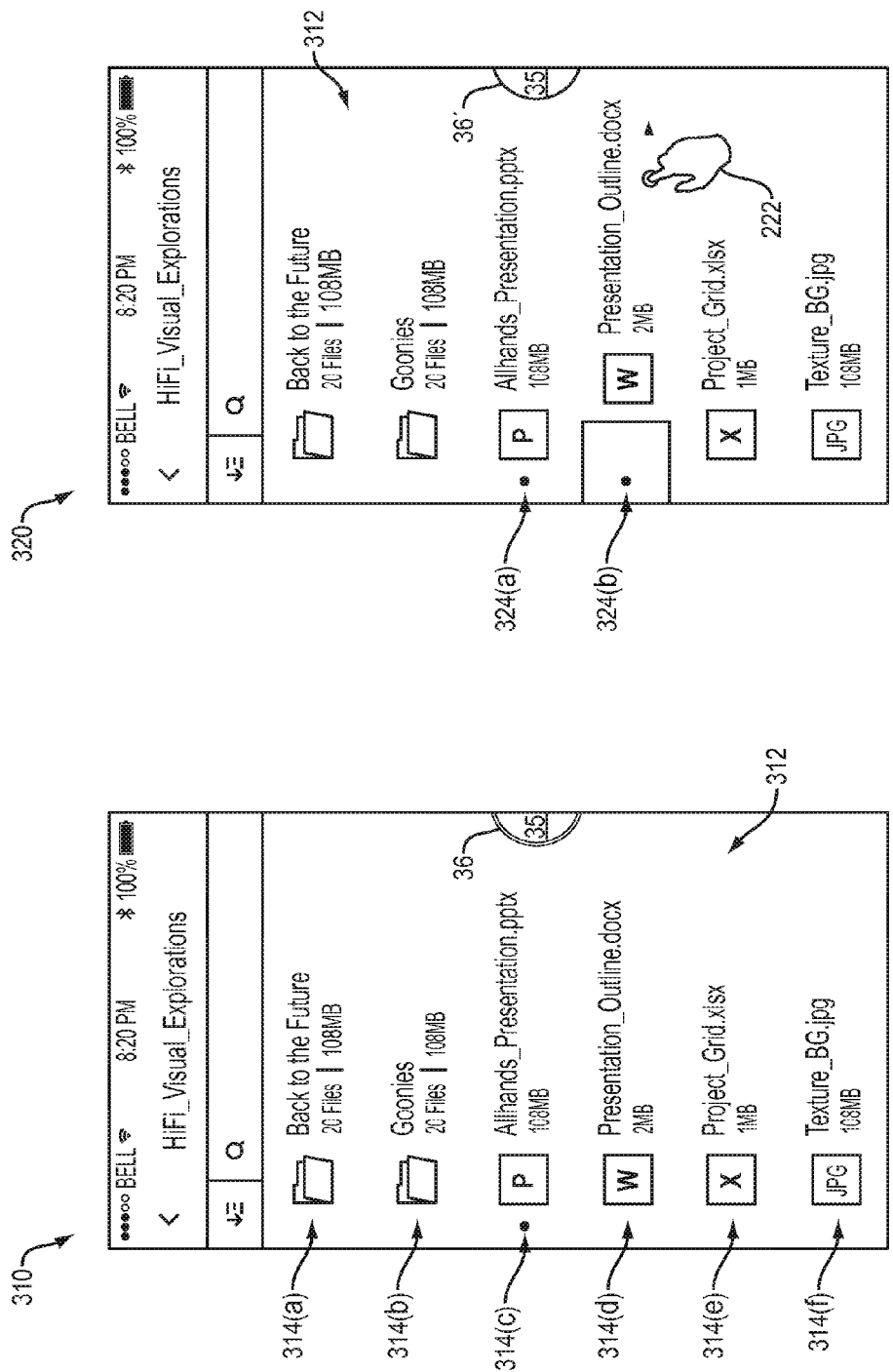

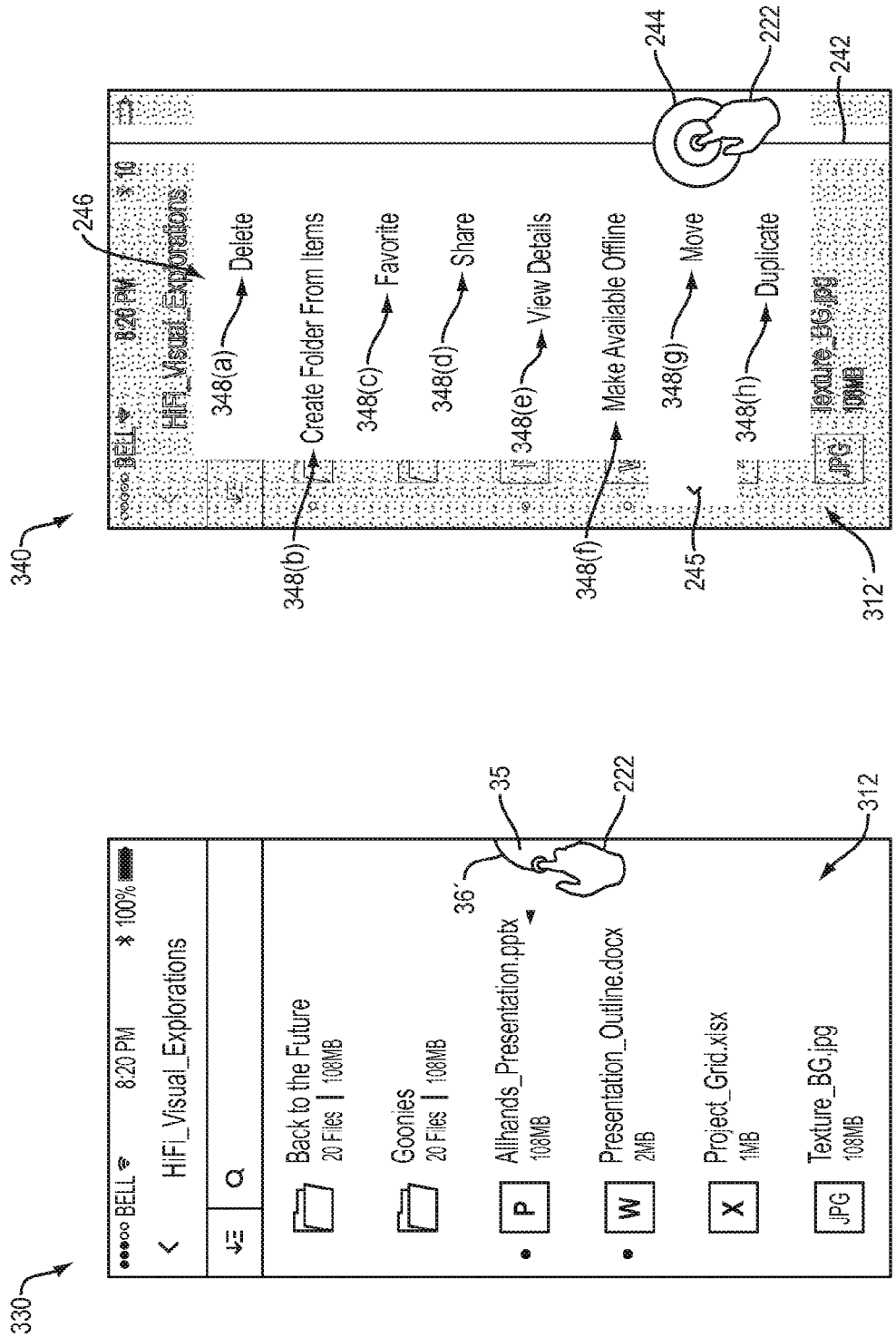

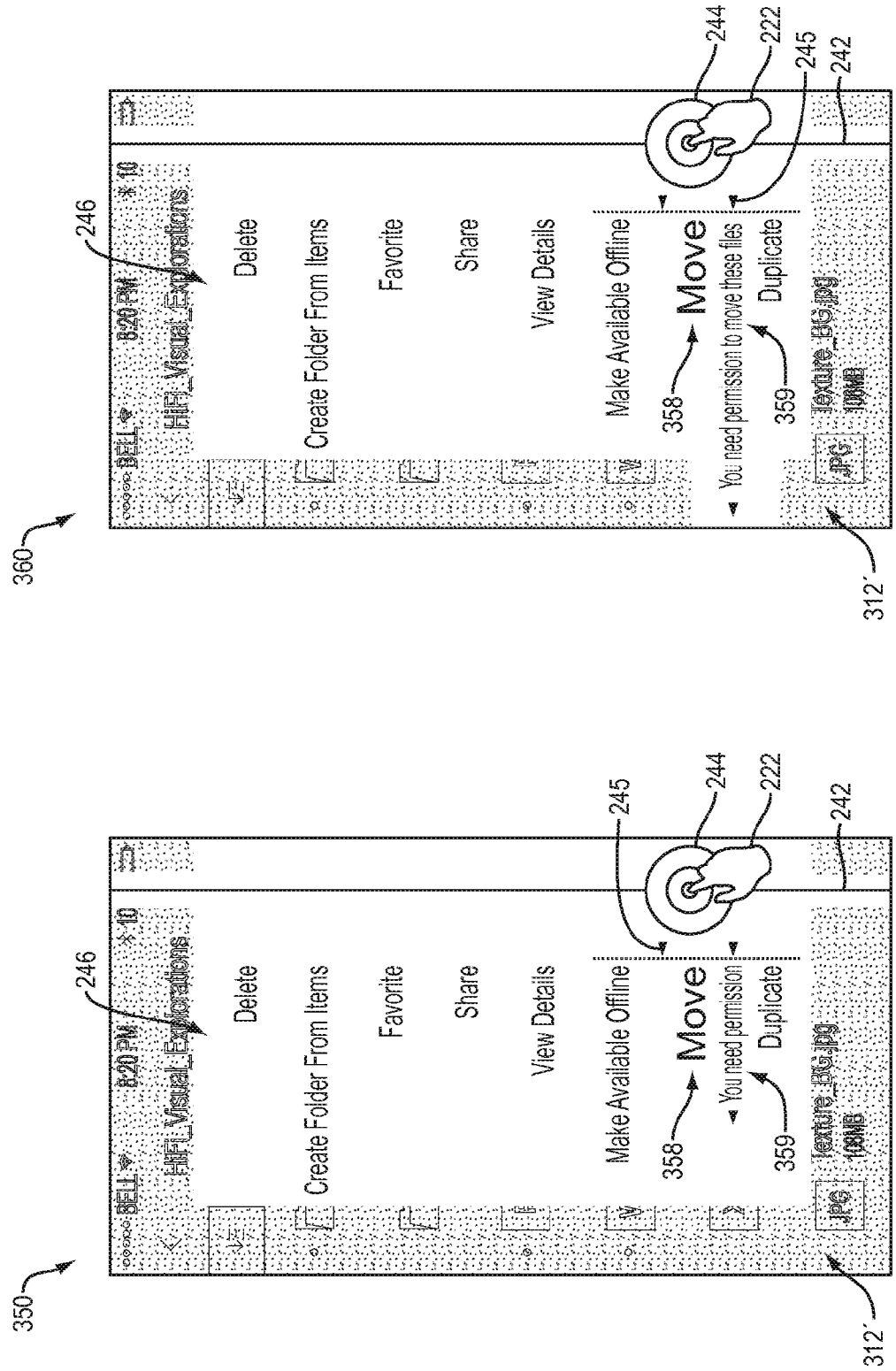

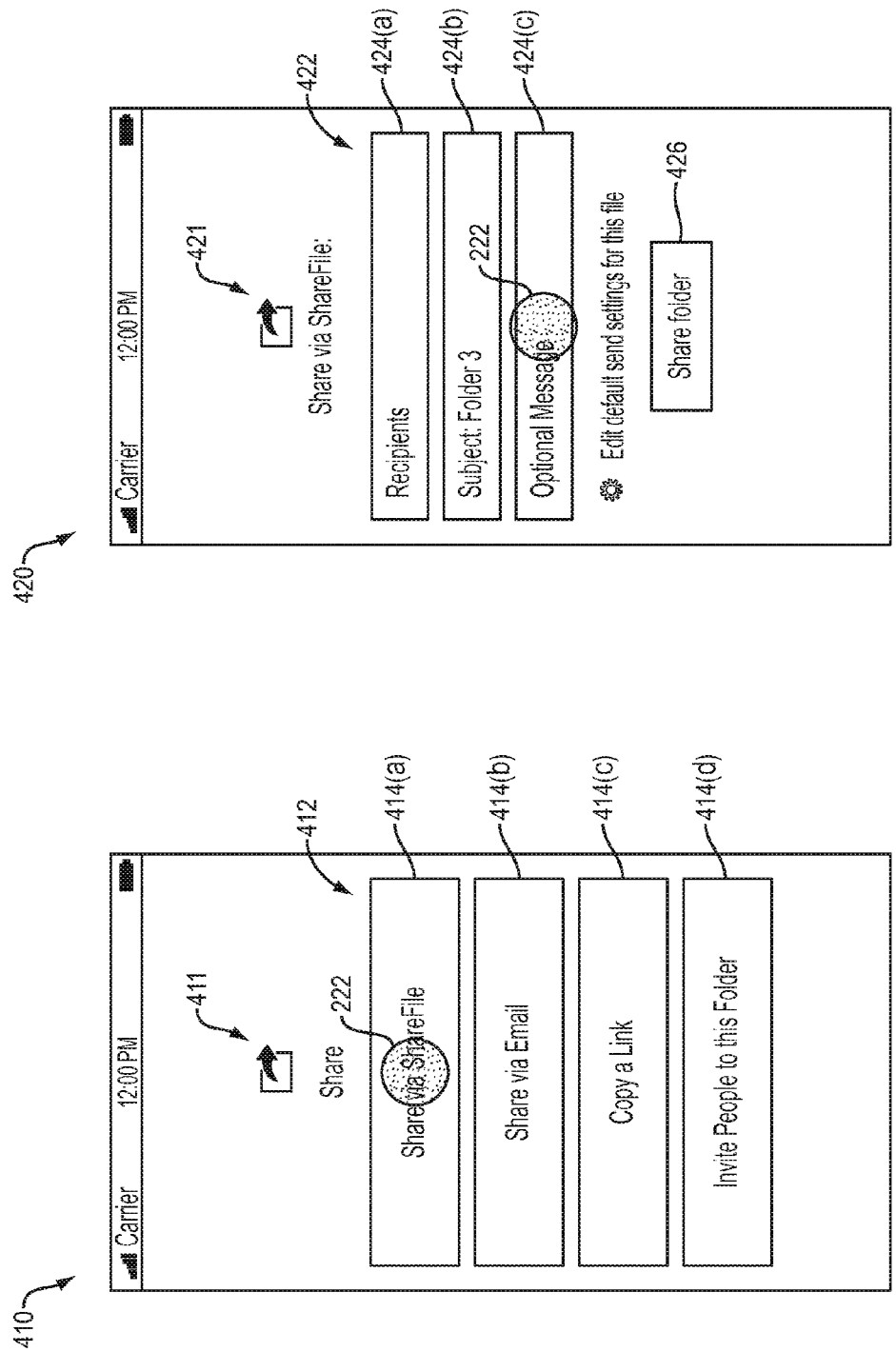

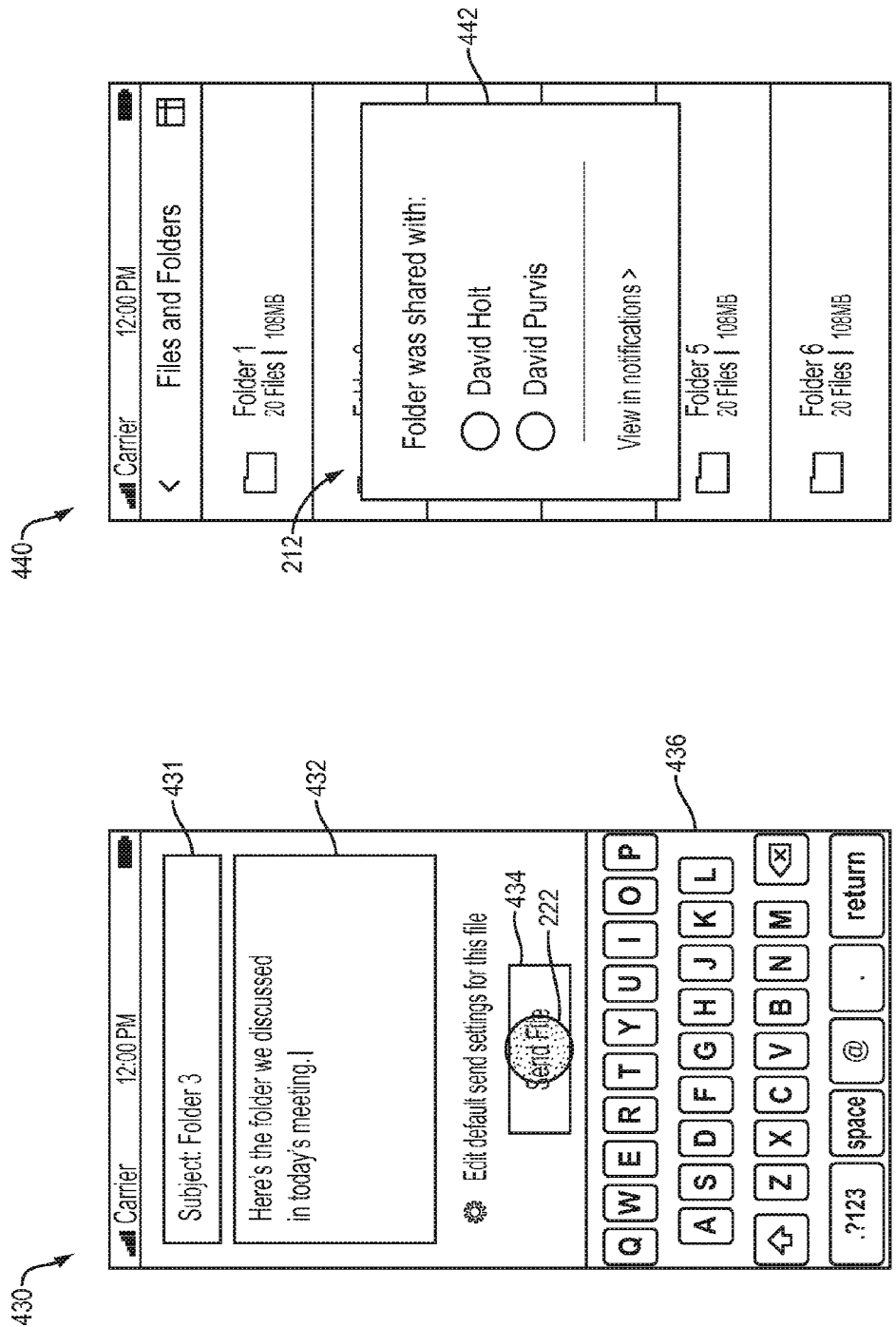

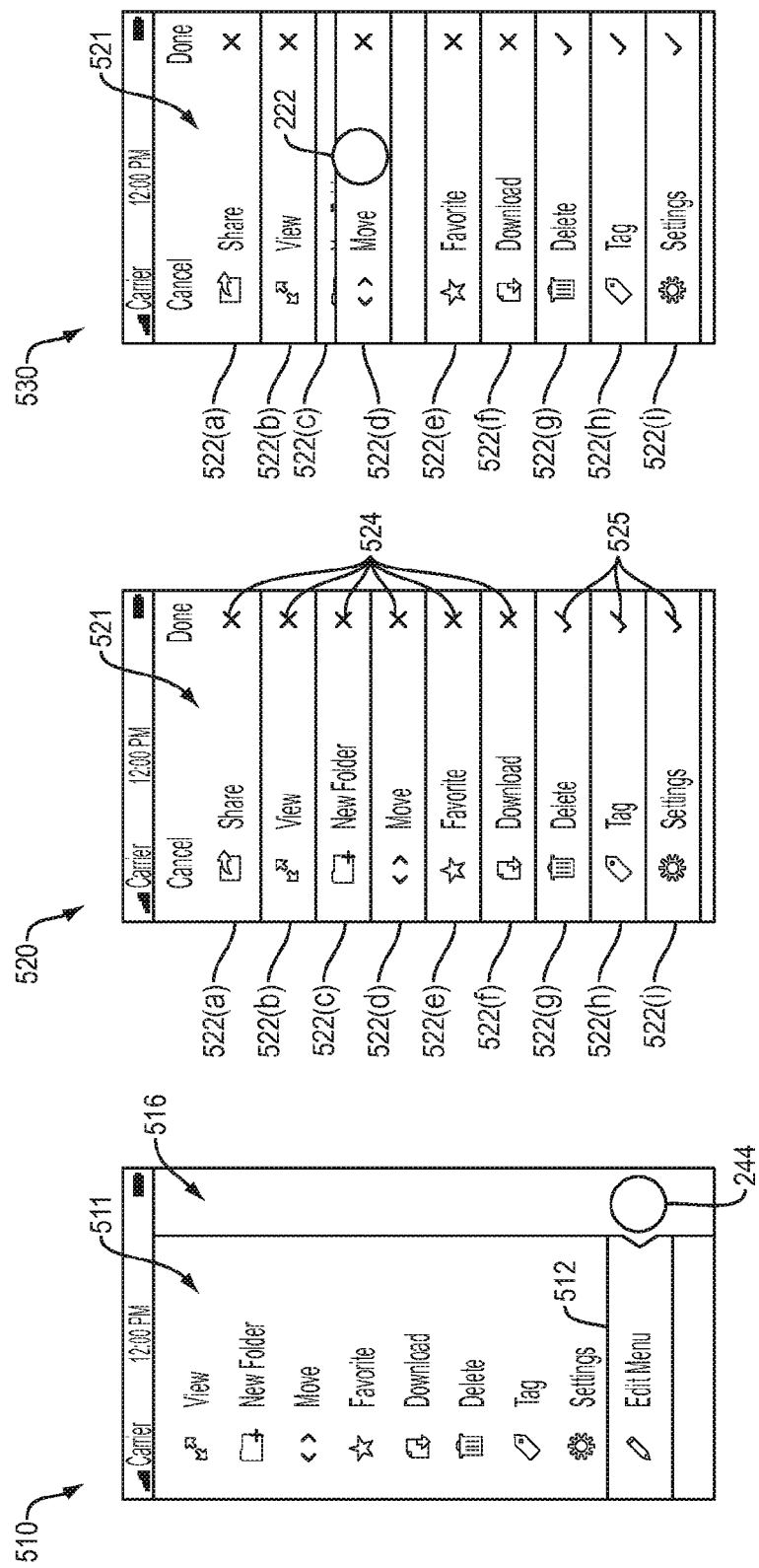

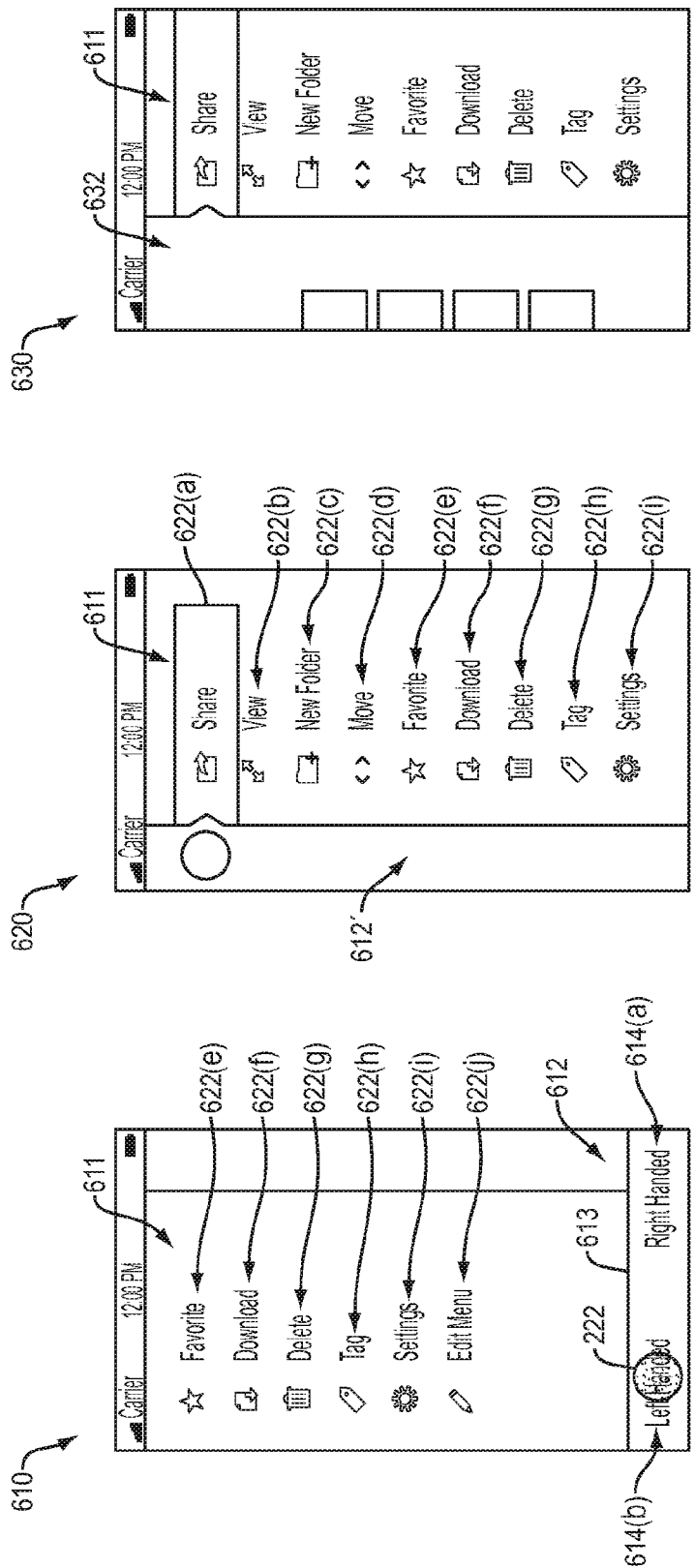

GESTURE MENU

RELATED APPLICATIONS

This application claims priority to Provisional U.S. Patent Application No. 61/931,210, entitled "GESTURE MENU," filed on Jan. 24, 2014, the contents and teachings of which are hereby incorporated herein in their entirety by this reference. This application claims priority to Provisional U.S. Patent Application No. 61/987,220, entitled "TECHNIQUES FOR SELECTING LIST ITEMS USING A SWIPING GESTURE," filed on May 1, 2014, the contents and teachings of which are hereby incorporated herein in their entirety by this reference.

BACKGROUND

Many mobile devices, such as smart phones and tablets, include a touchscreen that allows a user to operate applications by touching and swiping the touchscreen. When a list of items is displayed on the touchscreen, a particular item may be selected by tapping or swiping on the item. In some systems, a menu may be configured to appear upon such an action, allowing the user to take actions associated with the selected item.

SUMMARY

Unfortunately, the above-described conventional systems suffer from deficiencies. For example, the user may wish to select an item without proceeding to a menu. As an additional example, within the menu, the user may be required to scroll through many options, and the user will typically have to tap the screen. However, tapping the screen may be undesirable.

Thus, it would be desirable to allow the user to easily select when to display a menu. It would also be desirable to allow the user to navigate the menu with simple swipe operations without requiring the user to remove his finger or stylus from the touchscreen during the course of navigation.

In contrast to the above-described approaches, this disclosure relates to a user interface for a small handheld touchscreen device in which a user is able to easily access a menu overlaid over an application by gesturing with a finger in a convenient manner. Typically, once the menu is activated, the user is able to navigate the menu through swiping motions without removing the finger from the screen.

One embodiment of the improved techniques is directed to a method performed by a computing device of presenting a menu of an application running on the computing device on a touchscreen of the computing device. The method includes (a) receiving a signal from the touchscreen indicating that a user has touched a menu activation element (MAE) displayed on a screen of the application, (b) in response to receiving the signal, displaying the menu on the touchscreen, (c) receiving a signal from the touchscreen indicating that the user is sliding a cursor across the touchscreen in a first direction and, in response, moving a display position of a slider element of the menu correspondingly on the touchscreen, (d) receiving a signal from the touchscreen indicating that the user has slid the cursor in a second direction substantially orthogonal to the first direction past a selection threshold and, in response, selecting a menu item corresponding to a current location of the cursor, and (e) in response to selecting the menu item, performing an action corresponding to the menu item. Other embodiments are directed to a system, a computerized apparatus, and a computer program product for performing methods similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

FIGS. 3A-3I depict a sequence of example screens of a graphical user interface according to various embodiments for displaying a menu and selecting a menu item.

FIGS. 4A-4G depict a sequence of example screens of a graphical user interface according to various embodiments for selecting a non-permitted menu item.

FIGS. 5A-5D depict a sequence of example screens of a graphical user interface according to various embodiments for displaying a submenu.

FIGS. 6A-6C depict a set of example screens of a graphical user interface according to various embodiments for modifying a menu.

FIGS. 7A-7C depict a set of example screens of a graphical user interface according to various embodiments for modifying a menu orientation.

DETAILED DESCRIPTION

This disclosure relates to a user interface for a small handheld touchscreen device in which a user is able to easily access a menu overlaid over an application by gesturing with a finger in a convenient manner. Typically, once the menu is activated, the user is able to navigate the menu through swiping motions without removing the finger from the screen.

Figure 1:
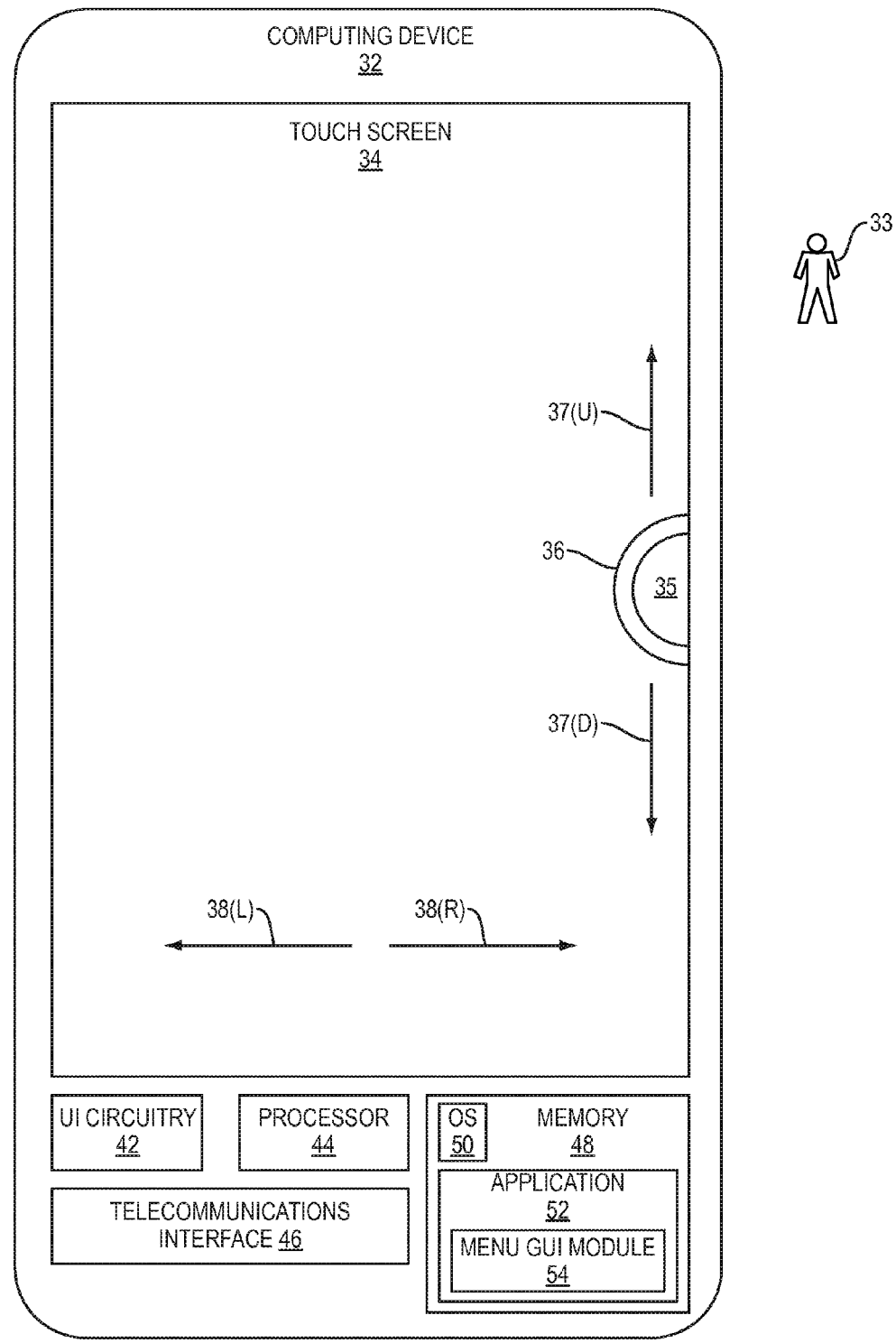
FIG. 1 is a block diagram depicting an example computing device according to various embodiments.

FIG. 1 depicts an example computing device 32. Computing device 32 may be any kind of computing device, but typically will be a portable handheld computing device such as a smart phone, a tablet computer, a laptop computer, or a similar device. Computing device 32 includes a touchscreen 34, which is a display screen that displays a graphical user interface to a user 33 and is capable of receiving user feedback by the user 33 touching the touchscreen 34 (e.g., with one or more fingers) and tapping, holding, or swiping a finger or stylus across the touchscreen 34.

Computing device 32 also includes user interface circuitry 42 for controlling the display and input functions of the touchscreen 34, a processor 44, memory 48, and, optionally, a telecommunications interface 46. Processor 44 may include any kind of processor or set of processors configured to perform operations, such as, for example, a microprocessor, a multi-core microprocessor, a digital signal processor, a system on a chip, a collection of electronic circuits, a similar kind of controller, or any combination of the above. Telecommunications interface 46 may include a cellular modem and/or any kind of wireless data transceiver device or a wired data transceiver device.

Memory 48 may be any kind of digital system memory, such as, for example, random access memory (RAM). Memory 48 stores an operating system (OS) program 50

(e.g., Linux, UNIX, Windows, Android, iOS, or a similar operating system) and applications executing on processor 44 as well as data used by those programs. Applications, when stored in non-transitory form in memory 48 or on a persistent form of storage, form a computer program product. The processor 44 running one or more of these applications thus forms a specialized circuit constructed and arranged to carry out the various processes described herein. One particular application 52 includes a menu graphical user interface (GUI) module 54, which operates to allow the user 33 to perform menu control operations with convenient gestures on the touchscreen 34 in conjunction with non-menu operation of the application 52.

Figure 2:
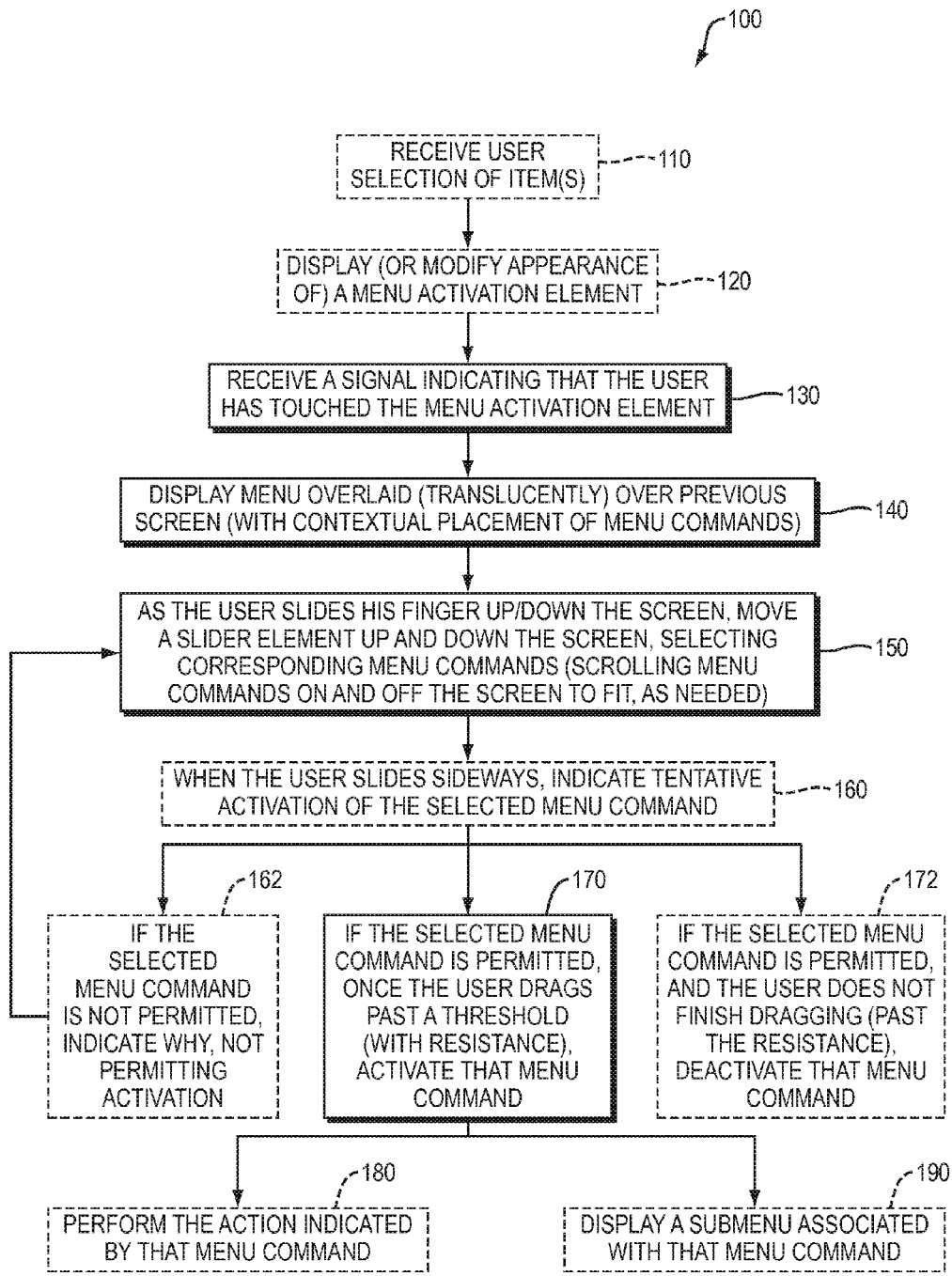
FIG. 2 is a flowchart depicting an example method according to various embodiments.

FIG. 2 depicts an example method 100 performed by application 52, primarily by menu GUI module 54. It should be understood that any time a piece of software, such as, for example, application 52 or menu GUI module 54, is described as performing a method, process, step, or function, in actuality what is meant is that a computing device (e.g., computing device 32) on which that piece of software is running performs the method, process, step, or function when executing that piece of software on its controller (e.g., processor 44).

In some embodiments, a menu activation element (MAE) 35 (e.g., the semi-circular shape depicted on the right side of touchscreen 34 in FIG. 1), is always displayed during operation of application 52. In other embodiments, the MAE 35 is only displayed after the user 33 takes an action of a particular type. In yet other embodiments, the MAE 35 is always displayed during operation of application 52, but the appearance of the MAE 35 is modified after the user 33 takes an action of the particular type. For example, a portion 36 of the MAE 35 may change in color, pattern, etc.

Figure 3I:
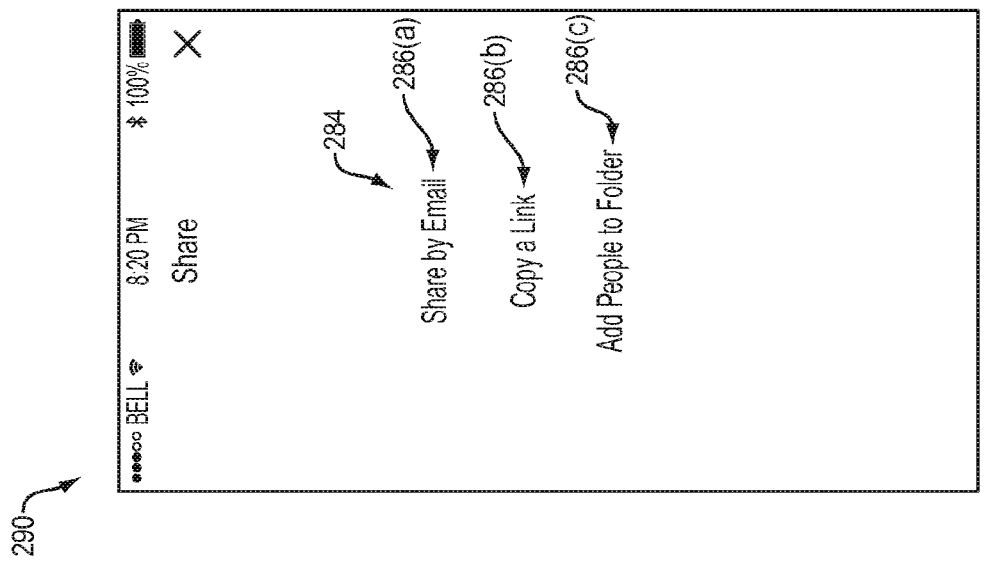

In embodiments in which the MAE 35 is either (A) only displayed after the user 33 takes an action of the particular type or (B) modified in appearance after the user 33 takes an action of the particular type, optional steps 110, 120 precede the rest of the method 100. In these embodiments, application 52 operates to allow the user 33 to view and perform operations on objects which are displayed in a list on touchscreen 34. See FIG. 3A, in which several folders 214 (depicted as folders 214(a), 214(b), ..., 214(f)) are listed on the touchscreen 34 on example screen 210. The list 212 may extend off the touchscreen 34, if there are more objects than can be displayed on the touchscreen 34 at once, in which case, the list 212 may scroll.

In optional step 110, application 52 receives a selection of one or more items 214 from the list 212. See FIG. 3B for a depiction of the user 33 selecting the Presentation_Outline folder 214(d) (also depicted as selected folder 224(b)), and see FIG. 3C for a depiction of two folders (Allhands_Presentation 214(c) (also depicted as selected folder 224(a)) and Presentation_Outline 214(d) (also depicted as selected folder 224(b))) having already been selected. This selection of one or more items 214 from a list 214 may be performed according to various techniques, several of which are described in Provisional U.S. Patent Application No. 61/987,220, entitled "TECHNIQUES FOR SELECTING LIST ITEMS USING A SWIPING GESTURE," filed on May 1, 2014.

In optional step 120, in response to step 110, menu GUI module 54 causes the MAE 35 to either (A) be displayed on the touchscreen or (B) have its appearance modified. In the embodiments depicted, the MAE 35 is displayed prior to any list item being selected (see FIG. 3A), but the appearance of the MAE 35 is modified (see FIG. 3B) after one or more list items are selected (e.g., the color of border portion 36 turns from white to black, depicted as modified border portion 36').

Once the MAE 35 is displayed, the user 33 may touch the MAE 35 on the touchscreen 34, in which case, UI circuitry 42 informs the menu GUI module 54 that the user 33 has touched the MAE 35. Thus, in step 130, menu GUI module 54 receives a signal indicating that the user 33 has touched the MAE 35. Step 130 will be explained in further detail below, in connection with FIG. 8.

In some embodiments, MAE 35 may not be selected while the initial border portion 36 is displayed until the modified border portion 36' is displayed. However, in other embodiments, the MAE 35 may be selected regardless of whether the initial border portion 36 or the modified border portion 36' is displayed.

In response to receiving the signal 130, in step 140, menu GUI module 54 displays a menu overlaid over the previous screen. Thus, once the user 33 presses the MAE 35 (see FIG. 3C) the menu 246 is displayed over the list 212 of folders (see FIG. 3D). In some embodiments, as depicted in example screen 240 of FIG. 3D, the menu is translucently displayed via compositing so that the list 212 of folders of the application 52 can be seen in a blurred manner in the background, depicted as shaded background list 212'. Although, as depicted, the background list 212' is only partially shown beneath a white foreground, this is for clarity of presentation only; in fact, the background list 212' is visible in a blurred manner in the background throughout the screen 240.

As depicted in FIG. 3D, the menu 246 includes the following example menu commands 248: Delete 248(a), Create Folder From Items 248(b), Favorite 248(c), Share 248(d), View Details 248(e), Make Available Offline 248(f), Move 248(g), and Duplicate 248(h). The menu 246 also includes a menu slider element 244 (depicted as a set of concentric circles in, e.g., FIG. 3D) positioned along the edge of the touchscreen 34, initially placed at or near the position on the touchscreen 34 where the user's finger is positioned upon activating the MAE 35. The slider element 244 is able to slide up and down the touchscreen 34 along a guideline 242 (e.g., along the left edge of the screen in FIG. 3D) as the user 33 moves his finger. The user 33 will not need to remove his finger from the touchscreen 34 in order to continue operating the menu 246. The term cursor 222 may be used herein to refer to the position of the user's finger on the touchscreen 34 at any given time.

In some embodiments, if the user 33 selects the MAE 35 when the initial border portion 36 is displayed (i.e., when no items 214 are selected), a modified set of menu commands 248 (that are accessible in the context of no particular list items 214 being selected) may be displayed within menu 246 instead of the standard set of menu commands 248. An example of this modified set of menu commands may include: Create New Document, Upload, Create Folder, Request Files, and Settings.

In some embodiments, the order of the menu commands 248 displayed within the menu 246 in step 140 is contextual. Thus, menu items 248 that are accessed by the user 33 more frequently (or in some embodiments, which are accessed by the user 33 most frequently in the particular context, e.g., when two list items 224(a), 224(b) are selected) are given preferential placement, towards the center of the touchscreen 34 or close to the position of the MAE 35 on the screen, so that the user 33 is able to select those menu items 248 easily without having to move his finger much after activating the MAE 35.

In step 150, as the user 33 slides his finger (cursor 222) up and down the touchscreen 34, the menu GUI module 54 causes the slider element 244 to move up and down the screen along the guideline 242. The menu GUI module 54 also causes different menu commands 248 to be selected as the slider 244 moves. As the slider 244 moves up (e.g., in direction 37(U) from FIG. 1), menu commands 248 further up the menu 246 are sequentially selected as currently-selected menu command 258 (see FIG. 3E), while, as the slider 244 moves down (e.g., in direction 37(D) from FIG. 1), menu commands 248 further down in the menu 246 are sequentially selected. If the menu 246 contains more menu commands 248 than can fit on the touchscreen 34 at once, the position of the menu commands 248 may scroll as the slider element 244 is moved so that all menu commands 248 are displayed as the slider element 244 moves throughout the length of the guideline 242. The currently-selected menu command 258 will always be positioned adjacent to the slider element 244 so that the user 33's finger is adjacent to the currently-selected menu command 258 (see FIG. 3E, in which the Share command 248(d) is currently selected). Typically the currently-selected menu command 258 is highlighted or presented in a larger font than the other menu commands 248, which may be dimmed in some embodiments.

The user 33 is able to activate the currently-selected menu command 258 by sliding his finger perpendicular to the guideline into the menu command (e.g., in direction 38(L) from FIG. 1). It should be understood that direction 38(L) is substantially orthogonal to directions 37(U) and 37(D), meaning that a typical user 33 would perceive these directions as being orthogonal (e.g., within 5 degrees or 10 degrees of 90 degrees).

In optional step 160, when the user 33 slides his finger sideways, the menu GUI module 54 indicates tentative activation of the currently-selected menu command 258. As depicted in example screens 250, 260, 270, 280 of FIGS. 3D-3H, when the user 33 slides the cursor 222 into the Share command 248(d), the Share command 248(d) is tentatively activated, as indicated by the fact that the other menu commands 248 begin to dim or disappear from the touchscreen 34 and the currently-selected Share command 258 begins to slide to the left (direction 38(L)) and become bolder or larger. In embodiments in which step 160 is used, the activation will remain tentative until the user 33 drags the currently-selected menu command 258 left past a threshold position 282 on the screen (see FIG. 3H). In some embodiments, as the threshold 282 is approached, the speed at which the currently-selected menu command 258 slides off to the left is reduced in comparison to the speed at which the user 33 slides his finger, indicating a "resistance" which indicates that the currently-selected menu command 258 is about to be fully activated.

In optional step 172, if the user 33 does not continue swiping all the way to the threshold 282 and instead retreats back to the guideline 242, the tentative activation of the currently-selected menu command 258 is revoked and operation continues back to step 150.

In step 170, once the user 33 swipes to the left, the currently-selected command 258 becomes activated. In embodiments in which step 160 is used, step 170 is only activated once the user 33 swipes far enough that the currently-selected menu command 258 reaches the threshold position 282.

Upon activation of the menu command 258, either step 180 or 190 is performed. Step 180 is associated with menu commands 258 that cause an action to be performed without any other input. Thus, in step 180, once the menu command 258 is fully activated, the action is immediately performed (e.g., a selected file is deleted).

Step 190, on the other hand, is associated with menu commands 258 that require further input before an action is performed. Thus, in step 190, menu GUI module 54 displays a sub-menu for further user 33 input. In some embodiments (see, e.g., screen 280 of FIG. 3H), the sub-menu 284 will slide onto the screen. In some embodiments, once the sub-menu 284 is displayed, the underlying application 52 screen will no longer be displayed in the background (see, e.g., screen 290 of FIG. 3I). An example of a sub-menu 411 associated with the Share command 248(d) is depicted in example screen 410 of FIG. 5A, with additional subsequent screens 420, 430, 440 depicted in FIGS. 5B-5D. At this point, the user 33 is able to remove his finger from the touchscreen 34, since the sub-menu 284 will typically utilize standard touch commands rather than drag commands.

In FIG. 5A, Share sub-menu 411 includes a set 412 of sub-menu choices 414. Upon the user 33 selecting a particular choice 414(a) (e.g., Share with ShareFile) with cursor 222, another sub-menu 422 is loaded on screen 420, which displays various options 424 and activation button 426. Upon the user 33 selecting a particular option 424(c) (e.g., to compose an optional message), another screen 430 is loaded, which displays various elements 431, 432, 434, 436 to allow a message to be composed and sent. Upon the user 33 selecting to send the message by pressing control 434 with cursor 222, screen 440 is loaded, which reverts back to the original list 212, but also includes a message 442 indicating that the folder has been shared.

In some embodiments, step 170 is only performed if the currently-selected menu command 258 is permitted to be performed in a contextually-aware manner. However, if, in the current context, the currently-selected menu command 258 is not permitted to be performed, then, in optional step 162, menu GUI module 54 displays an indication why the command is not able to be performed, and activation is not permitted. Thus, on screen 340 of FIG. 4D, the user 33 drags the slider element 244 down to the Move command 348(g). However, as the user 33 tries to swipe to the left to activate the Move command 348(g) (FIG. 4E), the Move command 358, although currently-selected, does not slide to the left, and the user 33 is informed by message 359 that the user 33 does not have the necessary permission to move the selected file(s) (FIGS. 4E-4F).

Figure 4G:
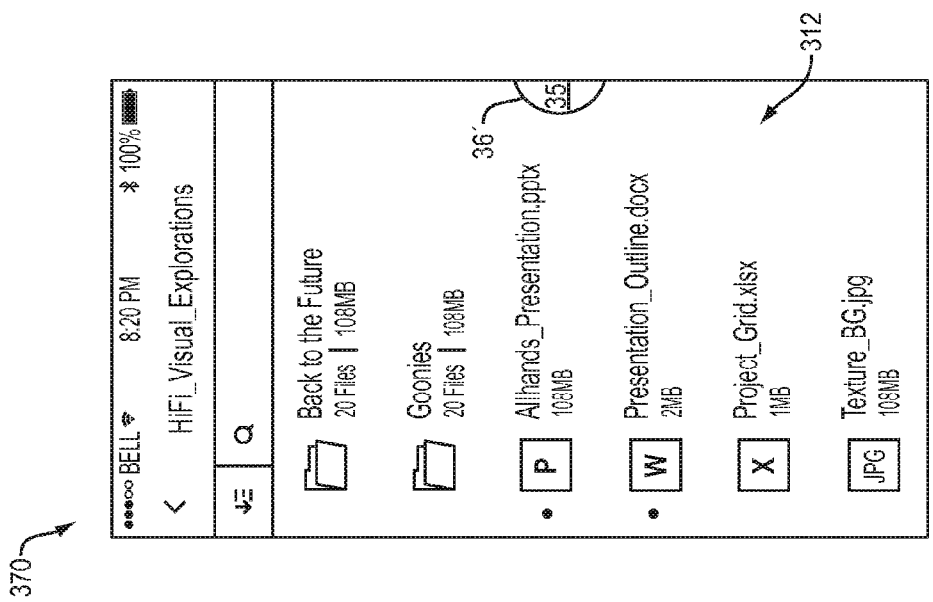

In some embodiments, in the menu, if the user 33 releases his touch from the touchscreen, the menu will disappear, returning the user 33 to the underlying application (see, e.g., FIG. 4G).

In some embodiments, the user 33 is able to customize the menu 246. Thus, FIG. 6A depicts, on screen 510, an example menu 511 in which an Edit Menu command 512 is visible and selected. Upon the user 33 selecting the Edit Menu command 512, an Edit Menu sub-menu 521 is displayed (see, e.g., screen 520 of FIG. 6B). As depicted in FIG. 6B, the Share 522(a), View 522(b), New Folder 522(c), Move 522(d), Favorite 522(e), and Download 522(f) menu commands are selected to be displayed within the menu 511 (as indicated by the presence of an X mark 524 next to those commands, which allows for removal), but the Delete 522(g), Tag 522(h), and Settings 522(i) menu commands are selected to not appear within the menu 511 (as indicated by the presence of a checkmark 525 next to those commands, which allows for insertion). The user 33 is able to remove a displayed menu command by pressing the X mark 524 next to a particular displayed menu command. Similarly, the user 33 is able to add a displayed menu command by pressing the checkmark 525 next to a particular non-displayed menu command.

In some embodiments, the user 33 is also able to choose the order of the menu commands. Thus, in FIG. 6C, the user 33 drags the Move command 522(d) from below the New Folder command 522(c) to instead be displayed above the New Folder command 522(c).

In some embodiments, the user 33 is able to customize the positioning of the MAE 35 and the menu slider 244. Thus, although by default the MAE 35 and the menu slider 244 may be positioned on the right side of the touchscreen 34 within right edge 612, a left-handed user 33 may wish to move those items to the left side of the touchscreen 34 so that he is better able to access those items with his left thumb. As depicted in FIG. 7A, while in an example menu 611 of screen 610, the user 33 may slide the cursor 222 all the way down to the bottom of the screen 610, at which point a prompt will be positioned at the bottom of the screen 610 allowing the user 33 to select between right-handed use 614(a) and left-handed use 614(b). Thus, to switch to left-handed use, the user 33 will slide all the way to the left, selecting left-handed use 614(b). Then, the menu 611 will switch sides so that, in screen 620 the slider 244 is positioned along the left side of the screen within left edge 612' (see FIG. 7B), and selection swipes are done towards the right (e.g., in direction 38(R) from FIG. 1) (see FIG. 7C).

In some embodiments, instead of the MAE 35 and menu slider 244 being positioned on the left (or right) sides of the touchscreen 34, these elements may instead be positioned along the top (or bottom) edges of the touchscreen 34.

The underlying application 52 is typically a list-based application that allows the user 33 to view and perform operations on objects which are displayed in a list on touchscreen 34. An example such application 52 is the ShareFile application produced by Citrix Systems, Inc. of Fort Lauderdale, Fla. and Bedford, Mass., in which the user 33 is able to share files. Thus, files and folders are typically listed. However, in other arrangements, other kinds of objects may be listed. In other embodiments, the underlying application may display elements in a non-ordered format. Thus, in a vector drawing program, the user 33 may be able to select drawn elements within a vector image instead of selecting ordered list elements 214 from a list 214.

Figure 8:
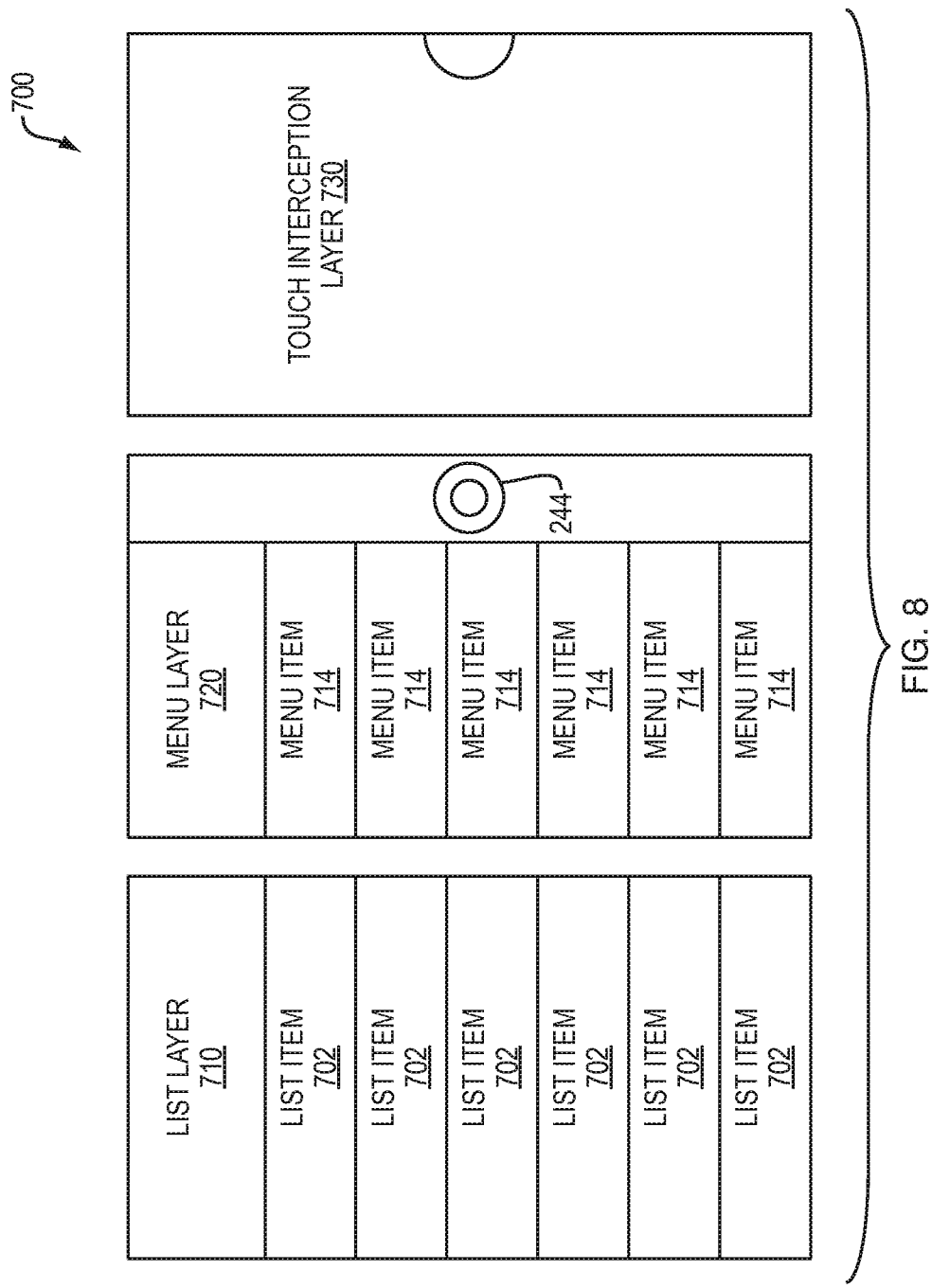
FIG. 8 depicts an example set of layers used to implement a menu according to various embodiments.

FIG. 8 depicts a layered software arrangement 700 to allow implementation within certain operating environments (e.g., iOS). In arrangement 700, list layer 710 represents the underlying application 52, which may display various list items 702 on the touchscreen 34 at any given time.

Touch interception layer 730 is a non-displaying layer that is overlaid over the list layer 710. If the user 33 touches an area of the screen defined within the touch interception layer 730 (e.g., the semi-circle on the right side), that is indicative of the user 33 touching the MAE 35. At that point, the touch interception layer 730 activates the menu layer 720 (which may be implemented as a conditionally-visible sub-layer of the touch interception layer 730). Once activated, the menu layer 720 displays a slider element 244 as well as a list of menu command items 714, with operation proceeding as above. Menu layer 720 is displayed over the list layer 710, and menu layer 720 may have a transparency value allowing the list layer 710 to be seen below it.

While various embodiments of the present disclosure have been particularly shown and described, it will be understood by those skilled in the art that various changes in form and details may be made therein without departing from the spirit and scope of the present disclosure.

For example, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

In addition, the term "touch" can refer to touching with a finger or any other manner of activating touchscreen 34, e.g., using a stylus, or, in some embodiments, hovering a finger or stylus just off the screen, as is well-known in the art.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method, performed by a computing device of presenting a menu of an application running on the computing device on a touchscreen of the computing device, the method comprising:
   receiving a signal from the touchscreen indicating that a user has touched with a finger a menu activation element (MAE) displayed on a screen of the application;
   in response to receiving the signal, displaying the menu on the touchscreen;
   receiving a signal from the touchscreen indicating that the user, without having lifted the finger, is sliding the finger across the touchscreen in a first direction and, in response, displaying the MAE as a slider element of the menu and moving a display position of the slider element correspondingly on the touchscreen;
   receiving a signal from the touchscreen indicating that the user, without having lifted the finger, has slid the slider element in a second direction substantially orthogonal to the first direction past a selection threshold and, in response, selecting a menu item corresponding to a current location of the slider element; and
   in response to selecting the menu item, performing an action corresponding to the menu item,
   wherein prior to receiving the signal from the touchscreen indicating that the user has slid the slider element in the second direction past the selection threshold, (i) displaying a tentative selection, (ii) determining that the tentative selection is associated with additional information, and (iii) displaying the additional information without the user having lifted the finger.

2. The method of claim 1 wherein:
   the application functions to display a list of items on the screen of the application, the application initially displaying the list of items without displaying the MAE;
   the method further comprises, in response to receiving a selection of an item from the list of items displayed on the screen of the application, causing the MAE to be displayed on the screen of the application.

3. The method of claim 1 wherein:
the application functions to display a list of items on the screen of the application, the application initially displaying the MAE with a first appearance;
the method further comprises, in response to receiving a selection of an item from the list of items displayed on the screen of the application, causing the MAE to be displayed on the screen of the application with a second appearance different than the first appearance.

4. The method of claim 3 wherein the first appearance includes a first color for a portion of the MAE and the second appearance includes a second color for the portion of the MAE, the second color not appearing within the portion of the MAE for the first appearance.

5. The method of claim 3 wherein the composition of the menu is dependent on whether or not the MAE has the first appearance or the second appearance when touched by the user.

6. The method of claim 1 wherein:
a non-displaying touch interceptor layer operates over the screen of the application;
receiving the signal from the touchscreen indicating that the user has touched the MAE includes receiving the signal from the touchscreen indicating that the user has touched an area of the touchscreen within an active area of the non-displaying touch interceptor layer corresponding to the location of the MAE; and
displaying the menu on the touchscreen includes overlaying a visible menu layer over the screen of the application.

7. The method of claim 6 wherein overlaying the visible menu layer over the screen of the application includes blurring the screen of the application and displaying the menu over the blurred application screen using compositing.

8. The method of claim 1 wherein displaying the menu on the touchscreen includes ordering menu items of the menu displayed on the touchscreen based on previous usage patterns of the user.

9. The method of claim 1 wherein:
the MAE and the slider element are positioned on a first side of the touchscreen;
the slider element is configured to translate along the first side of the touchscreen; and
receiving the signal from the touchscreen indicating that the user has slid the slider element in the second direction substantially orthogonal to the first direction includes receiving the indication indicating that the user has swiped from the first side of the touchscreen towards a second side of the touchscreen opposite the first side.

10. The method of claim 9 wherein the menu includes a control element that allows the user to select to move the MAE to the second side of the touchscreen, wherein, upon operating the control element, the MAE moves to the second side of the touchscreen and the slider element is reconfigured to translate along the second side of the touchscreen.

11. The method of claim 1 wherein the method further comprises displaying an arrow pointing in the second direction adjacent to the slider element to indicate to the user that the menu item corresponding to the current location of the slider element may be selected by sliding in the second direction.

12. The method of claim 1 wherein, prior to receiving the signal from the touchscreen indicating that the user has slid the slider element in the second direction past the selection threshold, receiving a prior signal indicating that the user has slid the slider element in the second direction while another menu item corresponding to a prior location of the slider element corresponds to an action not permitted to be taken, and, in response:
refraining from selecting the other menu item; and
displaying on the touchscreen a reason why the other menu item may not be selected.

13. The method of claim 1 wherein just prior to receiving the signal from the touchscreen indicating that the user has slid the slider element in the second direction past the selection threshold, receiving a prior signal indicating that the user has slid the slider element in the second direction from the current location of the slider element but has not yet reached the selection threshold, and, in response, displaying a tentative selection of the menu item.

14. The method of claim 13 wherein displaying the tentative selection of the menu item includes displaying the menu item larger on the touchscreen and diminishing other menu items of the menu on the touchscreen.

15. The method of claim 13 wherein as the user continues to slide the slider element in the second direction towards the selection threshold, the slider element moves in the second direction in an increasingly slow manner indicative of resistance to reaching the selection threshold.

16. The method of claim 1 wherein, prior to receiving the signal from the touchscreen indicating that the user has slid the slider element in the second direction past the selection threshold:
receiving a prior signal indicating that the user has slid the slider element in the second direction while another menu item corresponding to a prior location of the slider element is tentatively selected; and
prior to reaching the selection threshold while the other menu item is tentatively selected, the user slides the slider element substantially opposite to the second direction, resulting in the other menu item becoming no longer tentatively selected.

17. The method of claim 1 wherein performing the action corresponding to the menu item includes removing the menu from the touchscreen and causing the application to perform the action.

18. The method of claim 1 wherein performing the action corresponding to the menu item includes displaying a sub-menu.

19. The method of claim 18 wherein displaying the sub-menu includes displaying options to the user to allow the user to edit an order of menu items displayed on the menu.

20. The method of claim 18 wherein displaying the sub-menu includes displaying options to the user to allow the user to edit what menu items are displayed on the menu.

21. The method of claim 1 wherein:
the screen of the application is displayed on the touchscreen;
the signal indicating that the user has touched the MAE indicates that the user has touched the MAE on the touchscreen;
the MAE is displayed as a visible element on the touchscreen distinct from other areas of the touchscreen;
receiving the signal indicating that the user is sliding the slider element across the touchscreen in the first direction is performed subsequent to displaying the menu on the touchscreen; and
receiving the signal indicating that the user has slid the slider element in the second direction past the selection threshold is performed subsequent to receiving the signal indicating that the user is sliding the slider element across the touchscreen in the first direction.

22. The method of claim 1 wherein the MAE is a user-controllable element displayed on the touchscreen of the computing device.

23. The method of claim 22, wherein sliding the slider element in the first direction moves the slider element in succession from one menu item to a next menu item, and wherein sliding the slider element in the second direction effects a selection of a single menu item displayed under the slider element when sliding the slider element in the second direction.

24. A computer program product comprising a non-transitory computer-readable medium, which, stores instructions that, when executed by a computing device having a touchscreen, cause the computing device to perform the following operations:
   receiving a signal from the touchscreen indicating that a user has touched with a finger a menu activation element (MAE) displayed on a screen of an application running on the computing device;
   in response to receiving the signal, displaying the menu on the touchscreen;
   receiving a signal from the touchscreen indicating that the user, without having lifted the finger, is sliding the finger across the touchscreen in a first direction and, in response, displaying the MAE as a slider element of the menu and moving a display position of the slider element correspondingly on the touchscreen;
   receiving a signal from the touchscreen indicating that the user, without having lifted the finger, has slid the slider element in a second direction substantially orthogonal to the first direction past a selection threshold and, in response, selecting a menu item corresponding to a current location of the slider element; and
   in response to selecting the menu item, performing an action corresponding to the menu item,
   wherein prior to receiving the signal from the touchscreen indicating that the user has slid the slider element in the second direction past the selection threshold, (i) displaying a tentative selection, (ii) determining that the tentative selection is associated with additional information, and (iii) displaying the additional information without the user having lifted the finger.

25. A computing device comprising:
a touchscreen;
memory; and
control circuitry configured to perform the following operations:
   receiving a signal from the touchscreen indicating that a user has touched with a finger a menu activation element (MAE) displayed on a screen of an application running on the computing device;
   in response to receiving the signal, displaying the menu on the touchscreen;
   receiving a signal from the touchscreen indicating that the user, without having lifted the finger, is sliding the finger across the touchscreen in a first direction and, in response, displaying the MAE as a slider element of the menu and moving a display position of the slider element correspondingly on the touchscreen;
receiving a signal from the touchscreen indicating that the user, without having lifted the finger, has slid the slider element in a second direction substantially orthogonal to the first direction past a selection threshold and, in response, selecting a menu item corresponding to a current location of the slider element; and
in response to selecting the menu item, performing an action corresponding to the menu item,
wherein prior to receiving the signal from the touchscreen indicating that the user has slid the slider element in the second direction past the selection threshold, (i) displaying a tentative selection, (ii) determining that the tentative selection is associated with additional information, and (iii) displaying the additional information without the user having lifted the finger.

* * * * *